United States Patent
Kaleeswaran et al.

(10) Patent No.: US 12,321,818 B2
(45) Date of Patent: Jun. 3, 2025

(54) METHOD AND APPARATUS FOR DECODING OPTICAL CODES OF DIFFERENT ORIENTATIONS

(71) Applicant: E-CON SYSTEMS INDIA PRIVATE LIMITED., Chennai (IN)

(72) Inventors: Naveen Kaleeswaran, Chennai (IN); Surya P, Chennai (IN)

(73) Assignee: E-CON SYSTEMS INDIA PRIVATE LIMITED., Chennai (IN)

( * ) Notice: Subject to any disclaimer, the term of this patent is extended or adjusted under 35 U.S.C. 154(b) by 217 days.

(21) Appl. No.: 18/117,136

(22) Filed: Mar. 3, 2023

(65) Prior Publication Data

US 2024/0296300 A1   Sep. 5, 2024

(51) Int. Cl.
*G06K 7/14* (2006.01)
(52) U.S. Cl.
CPC ......... *G06K 7/1443* (2013.01); *G06K 7/1456* (2013.01)
(58) Field of Classification Search
None
See application file for complete search history.

(56) References Cited

U.S. PATENT DOCUMENTS 10,540,532 B2 *   1/2020   Musiani ............... G06K 7/1098

* cited by examiner

*Primary Examiner* — Thien M Le
*Assistant Examiner* — April A Taylor
(74) *Attorney, Agent, or Firm* — Sage Patent Group

(57) ABSTRACT

Embodiments of the present disclosure provide a method for decoding at least one optical code by a data reader. The method comprises obtaining an image comprising the at least one optical code being positionable in one of a plurality of orientations in one of a plurality of rows representing a plurality of regions in the image. The method comprises detecting a plurality of markers related to the at least one optical code by decoding pixels of each row in the image at a time by following an interval of pre-defined rows. The method comprises constructing at least one row representing at least one sub region in the image comprising the at least one optical code when no optical code is decoded from the plurality of markers. The method comprises decoding the constructed at least one row to derive data corresponding to the at least one optical code.

17 Claims, 13 Drawing Sheets

METHOD AND APPARATUS FOR DECODING OPTICAL CODES OF DIFFERENT ORIENTATIONS

TECHNICAL FIELD

The present application relates generally to the field of optical codes, and more specifically to decoding multiple optical codes, each having different orientations.

INTRODUCTION

Generally, optical codes have widespread applications. The optical codes can be used to identify a class of objects or unique items. An optical code is essentially a machine-readable representation of information in a visual format. Example of the optical code may be a barcode. The barcode can be classified as one-dimensional (1D) and two-dimensional (2D).

FIG. 1A depicts examples of 1D and 2D barcodes. Examples of the 1D and 2D barcodes may include, but are not limited to, CODE-128, CODE-39, CODE-93, UPC, EAN, QR-CODE, DATA-MATRIX, and so on.

Each optical code/barcode may have its own data encoding characteristics. The 1D barcode can encode data in a linear manner, whereas the 2D barcode can store the data in form of a matrix.

FIG. 1B depicts various sections/fields of the 1D barcode. As depicted in FIG. 1B, the 1D barcode may include sections such as, a quiet zone, a start code, an encoded data, a check digit, a stop-code, and a quite zone.

A data reader or a scanner system can be used to decode the optical code/barcode. In the prior art, for decoding the optical code, the data reader obtains an image comprising the optical code. The data reader performs a binarization in the image to convert a gray scale image into black white (binary) based on a particular threshold value. The binarization may be mainly used to differentiate the optical code values from a background. For example, the binarization performed in the image with a threshold value of 128 is depicted in FIG. 1C.

The data reader uses different binarization techniques such as, but are not limited to, a threshold binarization, an adaptive binarization, a global histogram based binarization, and so on, to calculate the threshold value. The adaptive binarization dynamically calculates the threshold value locally based on a scene luminance. The global histogram based binarization calculates the threshold value based on a histogram of the image calculated globally.

For example, an image needed to be binarized is depicted in FIG. 1D. Results of applying the threshold binarization and the adaptive binarization on the image are depicted in FIGS. 1E and 1F.

After performing binarization in the image, the data reader decodes the optical code. The data reader determines the start code of the optical code by scanning a single row of the image with a row interval (for example, by skipping 5 rows) and records pattern data. If the pattern data matches with the start code, the data reader checks whether there is the quiet zone before the start code (i.e., white space). If there is the quiet zone before the start code, the data reader decodes the data after the start code. The data reader then evaluates a checksum related to the decoded data with the check digit. The data reader looks for the stop code once the decoded data is matched with the check digit and checks the quiet zone after the stop code.

Thus, in the prior art, the data reader performs binarization/pre-processing of the image to find a location of the optical code for decoding, which increases processing time.

SUMMARY

Exemplary embodiments include a method performed by a data reader for decoding at least one optical code. The method comprises obtaining an image comprising the at least one optical code being positionable in one of a plurality of orientations in one of a plurality of rows representing a plurality of regions in the image. The method comprises detecting a plurality of markers related to the at least one optical code by decoding pixels of each row in the image at a time by following an interval of pre-defined rows, wherein said markers identify positioning information and optical code format information of the at least one optical code in the image. The method comprises constructing at least one row representing at least one sub region in the image comprising the at least one optical code when no optical code is decoded from the detected plurality of markers, wherein the at least one row is constructed by grouping the plurality of markers based on a position of each marker and a pixel distance defined for grouping of markers. The method comprises decoding the constructed at least one row to derive data corresponding to the at least one optical code.

Advantageously, multiple optical codes, each having different orientations may be decoded with high accuracy and speed. The optical codes may be decoded without performing any image processing/tracing mechanism in the image to find the positioning information/location of the optical codes. As a result, processing time in decoding the optical codes may be reduced.

Further, detecting the plurality of markers related to the at least one optical code by decoding pixels of each row in the image at a time by following the interval of pre-defined rows ensures that no markers/start codes of the optical codes are eliminated in the same row. Thus, all the markers of the optical codes (including detected and non-detected optical codes) may be detected.

In some embodiments, the step of constructing the at least one row comprises selecting at least two markers that are in a same group. The method comprises deriving, in accordance with analysis of the selected at least two markers, a decision parameter indicating how to construct the at least one row. Based on the derived decision parameter, the method comprises constructing the at least one row comprising the at least one optical code.

In some embodiments, the constructed at least one row comprises a plurality of pixels and is in perpendicular to the selected at least two markers.

In some embodiments, the step of deriving the decision parameter comprises identifying a first coordinate and a second coordinate of each of at least one first marker and at least one second marker of the selected at least two markers. The method comprises determining a first coordinate difference by identifying a difference between the first coordinate of the at least one first marker and the first coordinate of the at least one second marker. The method comprises determining a second coordinate difference by identifying a difference between the second coordinate of the at least one first marker and the second coordinate of the at least one second marker. The method comprises deriving the decision parameter based on the first coordinate difference and the second coordinate difference.

In some embodiments, the step of deriving the decision parameter further comprises determining whether the first coordinate difference greater than the second coordinate difference or the second coordinate difference greater than the first coordinate difference lies within a pre-defined angle. When it has been determined that the first coordinate difference greater than the second coordinate difference lies within the pre-defined angle, the method comprises deriving the decision parameter based on the first coordinate difference. When it has been determined that the second coordinate difference greater than the first coordinate difference lies within the pre-defined angle, the method comprises deriving the decision parameter based on the second coordinate difference.

In some embodiments, the method further comprises deciding to rotate the image to decode the at least one optical code when the associated markers are not within the pre-defined angle.

Advantageously, construction of the at least one row based on the decision parameter may avoid any false patterns and increase accuracy of decoding the angled optical codes (i.e., having some inclination).

In some embodiments, the step of decoding the constructed at least one row comprises detecting at least one marker related to the at least one optical code by decoding pixels of the constructed at least one row. The method comprises decoding the detected at least one marker to generate the data corresponding to the at least one optical code.

In some embodiments, the step of decoding the detected at least one marker comprises recording pattern data related to the optical code present at an end of the at least one marker and determining whether the recorded pattern data matches with a pre-defined pattern data related to one of a plurality of optical codes. When it has been determined that the recorded pattern matches with the pre-defined pattern data, the method comprises decoding the pattern data to generate the data corresponding to the at least one optical code.

Exemplary embodiments include a data reader for decoding at least one optical code, the data reader comprises a scanner module, and a controlling circuitry. The scanner module is configured to obtain an image comprising the at least one optical code being positionable in one of a plurality of orientations in one of a plurality of rows representing a plurality of regions in the image. The controlling circuitry is configured to detect a plurality of markers related to the at least one optical code by decoding pixels of each row in the image at a time by following an interval of pre-defined rows, wherein said markers identify positioning information and optical code format information of the at least one optical code in the image. The controlling circuitry is configured to construct at least one row representing at least one sub region in the image comprising the at least one optical code when no optical code is decoded from the detected plurality of markers, by grouping the plurality of markers based on a position of each marker and a pixel distance defined for grouping of markers, wherein the at least one row is constructed by grouping the plurality of markers based on a position of each marker and a pixel distance defined for grouping of markers. The controlling circuitry is configured to decode the constructed at least one row to derive data corresponding to the optical code.

Exemplary embodiments include a computer program product comprising a non-transitory computer readable medium, having thereon a computer program comprising program instructions. The computer program is loadable into a data processing unit and configured to cause execution of the above-described method when the computer program is run by the data processing unit.

These and other objects, features, and advantages of embodiments of the present disclosure will become apparent upon reading the following Detailed Description in view of the Drawings briefly described below.

DETAILED DESCRIPTION

Figure 1A:
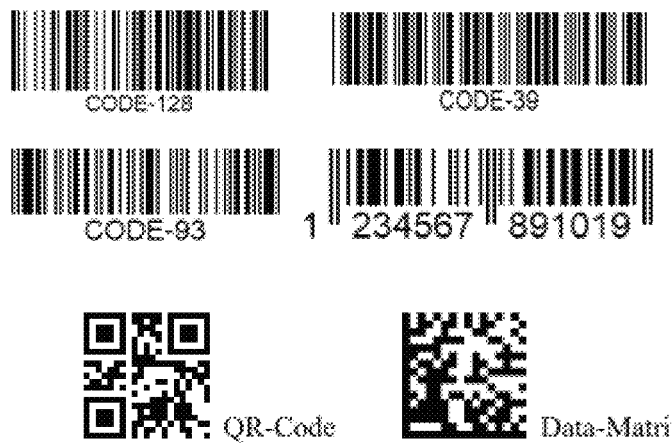
FIG. 1A depicts examples of one dimensional (1D) and two dimensional (2D) barcodes/optical codes.
Figure 1B:
FIG. 1B depicts various sections/fields of the ID barcode.
Figure 1C:
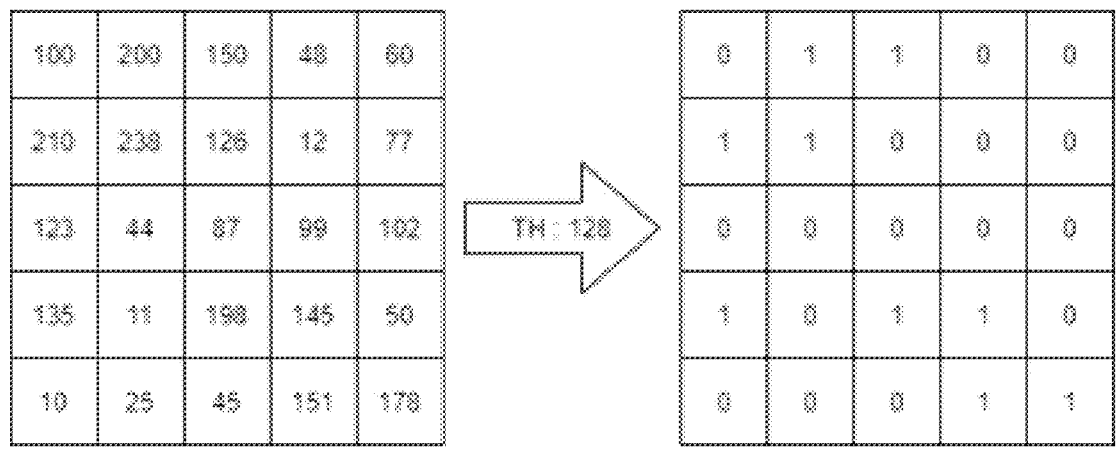
FIGS. 1C, 1D, 1E, and 1F depict binarization performed in an image comprising the optical code according to the prior art.
Figure 1E:
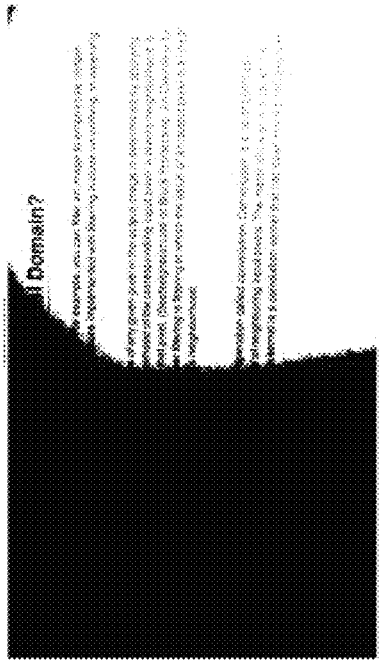
Figure 1D:
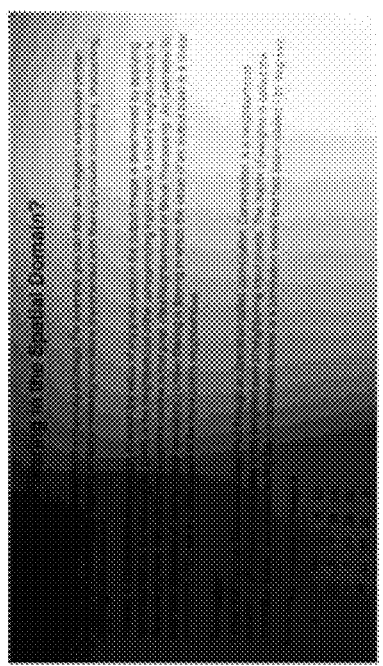
Figure 1F:
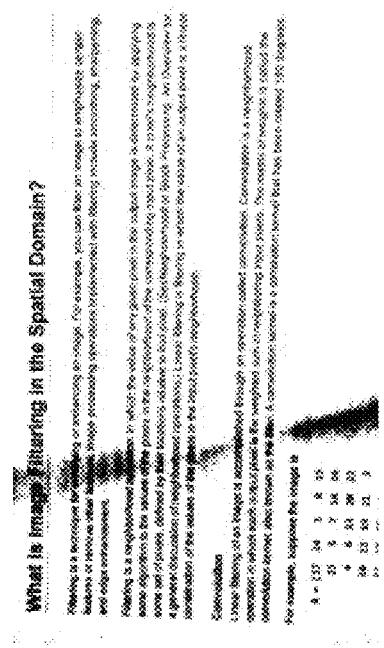

The embodiments herein, the various features, and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The terminology used herein is for the purpose of describing particular aspects of the disclosure only, and is not intended to limit the invention. It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the examples set forth herein.

It will be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. Referring now to the drawings, and more particularly to FIGS. 2 through 8, where similar reference characters denote corresponding features consistently throughout the figures, there are shown preferred embodiments.

Figure 2:
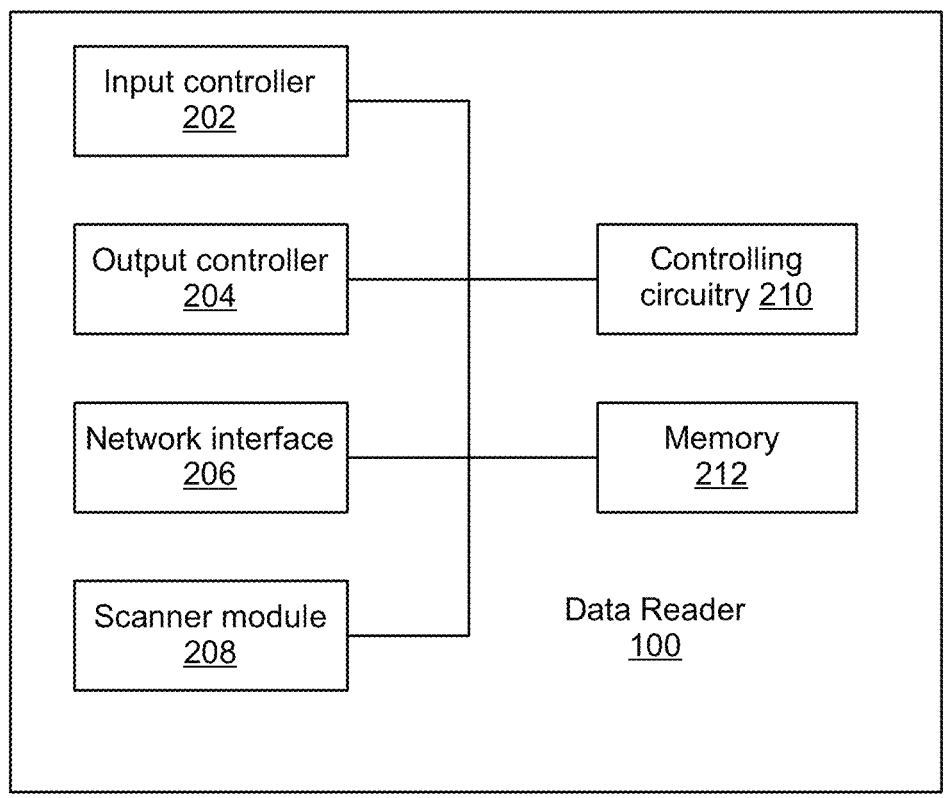
FIG. 2 discloses an exemplary data reader for decoding at least one optical code according to some embodiments.

FIG. 2 discloses an exemplary data reader 100 for decoding at least one optical code. The optical code referred herein may be used to identify a class of various objects such as, but are not limited to, goods, company assets, documents, or the like, and also to track production at manufacturing facilities and inventory at stores. The optical code may comprise data characters/code words and/or overhead characters represented by a particular sequence bars and spaces having varying widths. In embodiments disclosed herein, the optical code may be a one-dimensional (1D) barcode. The optical code may have different orientations.

The data reader 100 (also be referred to as scanner, scanning system, or the like) may be a scanner configured to read encoded data of the at least one optical code imprinted on various surfaces/objects. In some examples, the data reader 100 may include a flying sport scanner, an imaging based scanner, or the like. The flying sport scanner may be a laser-based scanner. The imaging based scanner may include solid-state imaging circuitry such as charge coupled devices (CCDs) and complementary metal-oxide semiconductor (CMOS) devices and may be implemented using a 1D or a two dimensional (2D) imaging array of photo sensors (or pixels) to capture the optical code. In some examples, the data reader 100 may comprise a multi-window scanner like a two-window scanner/bioptic scanner. The two-window scanner may comprise a lower window arranged in generally horizontal plane and an upper window arranged in a vertical plane with imaging based scammers, laser based scanners, or both, for reading the encoded data through the windows. It should be noted that the data reader 100 may include any other type of scanners including the above-described scanners.

As depicted in FIG. 2, the data reader 100 comprises an input controller 202, an output controller 204, a network interface 206, a scanner module 208, controlling circuitry 210, and a memory 212.

The input controller 202 may be configured to receive an input from the user to decode the at least one optical code or to control operations of the data reader 100. In some examples, the input controller 202 may include, but are not limited to, a keyboard, a pointing device, a microphone, a touch screen, a touchpad, and so on. In some examples, the input controller 202 may also be coupled to other interfaces such as, but are not limited to, data interfaces, bus interfaces, wired or wireless network adapters, modems for transmitting and receiving data. In some examples, the transmitted data may include decoded data of the optical code.

The output controller 204 may be configured to provide the decoded data of the optical code. In some examples, the output controller 204 may be one or more display units, a speaker, and so on. Examples of the display units may be, but are not limited to, a Liquid Crystal Display (LCD), a cathode ray tube (CRT) display, or other suitable display units.

The network interface 206 may be configured to enable the data reader 100 to communicate with one or more computing devices/host using a communication network. Examples of the communication network may include, but are not limited to, a cellular network, a wireless LAN, Wi-Fi, Bluetooth, Bluetooth low energy, Zigbee, Wi-Fi direct, WFD, Ultra-wideband, UWB, infrared data association, IrDA, near field communication, NFC, and so on. The data reader 100 may communicate with the one or more computing devices to receive images/image frames comprising the at least one optical code from the one or more computing devices. The data reader 100 may also communicate with the one or more computing devices to provide the decoded data of the at least one optical code to the one or more computing devices. Examples of the computing devices may include, but are not limited to, a computer, a point-of-sale (POS) terminal, a server, a mobile device, a personal digital assistant, PDA, a handheld device, a laptop computer, an embedded device, or a combination thereof.

The scanner module 208 may be configured to obtain/capture the image comprising the at least one optical code.

The controlling circuitry 210 may comprise one or more processors configured to decode the at least one optical code. In some examples, the controlling circuitry 210 may be embodied in or may include an integrated circuit, an application-specific integrated circuit (ASIC), a digital signal processor (DSP), a field programmable gate array (FPGA), a programmable logic controller (PLC), discrete hardware components, or any combination thereof. In some examples, the controlling circuitry 210 may be integrated into a single unit (for example, a single chipset or circuitry) that provides functionality in accordance with embodiments disclosed herein. The controlling circuitry 210 may execute one or more machine-accessible instructions, for example, computer-readable instructions and/or computer executable instructions, stored in the memory 212. The one or more machine-accessible instructions may embody or may include control logic for operation of the controlling circuitry 210 in accordance with embodiments disclosed herein.

For decoding the at least one optical code, the controlling circuitry 210 obtains the image from the scanner module 208. The image comprises the at least one optical code imprinted on the at least one object. The at least one optical code is positionable in one of a plurality of orientations in one of a plurality of rows representing a plurality of rows in the image. Thus, the at least one optical code referred herein may be a slant optical code/barcode, which may be 1D. In some examples, each optical code may include fields such as, a quiet zone, a start code, an encoded data, a check digit, a stop code, and a quiet zone. The encoded data may correspond to data related to the object on which the at least one optical code in imprinted. In some examples, the data may identify a type of the object, a price of the object, and so on. The data related to the object may be encoded using available encoding schemes.

Upon obtaining the image comprising the at least one optical code, the controlling circuitry 210 detects a plurality of markers related to the at least one optical code. The markers are the start codes of the at least one optical code identifying positioning information/location and optical code format information of the at least one optical code in the image. The optical code format information may indicate a type of the optical code/barcode. The controlling circuitry 210 detects the plurality of markers by decoding pixels of each row in the image at a time by following an interval of pre-defined rows. In some examples, the interval of pre-defined rows represents a number of rows to be skipped for decoding pixels. In some examples, the interval of pre-defined rows may include 10 rows that is 10 rows to be skipped.

For example, the controlling circuitry 210 decodes/scans the pixels of a first row (i.e., decoding the single row at a time) to detect the marker/start code related to the optical code. If the decoding fails, the markers may be pushed in an array. Once the decoding the pixels of the first row is successful, the controlling circuitry 210 scans the remaining pixels of the first row to detect any consecutive markers related to the consecutive optical codes. Similarly, the controlling circuitry 210 decodes the pixels of other rows until the end of the image by following interval of 10 rows to detect the plurality of markers. From such a decoding/scanning, no markers of the optical codes may be eliminated in the same row and the markers of non-detected optical codes may also be detected.

After detecting the plurality of markers, the controlling circuitry 210 decodes the plurality of markers to decode the at least one optical code (i.e., to derive data from the at least one optical code). When no optical code is decoded from the plurality of markers, the controlling circuitry 210 constructs at least one row (i.e., a new row) representing at least one sub region in the image comprising the at least one optical code. The at least one row may comprise an array of pixels. The controlling circuitry 210 constructs the at least one row by grouping the plurality of markers based on a position of each marker and a pixel distance for defined for grouping of markers. In some examples, the pixel distance may be 15, which indicates that the markers lie within the 15-pixel distance may be grouped. Thus, avoiding any false patterns and increasing accuracy of detecting the optical codes with inclinations. In some examples, the controlling circuitry 210 may construct two rows for a correct optical code.

For constructing the at least one row, the controlling circuitry 210 may select at least two markers of the plurality of markers that are in a same group. The controlling circuitry 210 may derive, in accordance with analysis of the selected at least two markers, a decision parameter indicating how to construct the at least one row. In some embodiments, the decision parameter may be derived in accordance with modified Bresenham's line drawing method.

For deriving the decision parameter, the controlling circuitry may identify a first coordinate (x1/x2) and a second coordinate (y1/y2) of each of the at least one first marker and at least one second marker of the selected at least two markers. The controlling circuitry 210 may determine a first coordinate difference (X-difference) by identifying a difference between the first coordinate (x1) of the at least one first marker and the first coordinate (x2) of the at least one second marker. The controlling circuitry 210 may also determine a second coordinate difference (Y-difference) by identifying a difference between the second coordinate (y1) of the at least one first marker and the second coordinate (y2) of the at least one second marker. Based on the first coordinate difference (X-difference) and the second coordinate difference (Y-difference), the controlling circuitry 210 may derive the decision parameter. The controlling circuitry may determine whether the determining whether the first coordinate difference greater than the second coordinate difference or the second coordinate difference greater than the first coordinate difference lies within a pre-defined angle. In some examples herein, the pre-defined angle may be −45 degree or +45 degree, so that the at least optical code with the orientation of up to 90 degree in the image may be decoded. When it has been determined that the first coordinate difference greater than the second coordinate difference lies within the pre-defined angle, the controlling circuitry 210 may derive the decision parameter based on the first coordinate difference. When it has been determined that the second coordinate difference greater than the first coordinate difference lies within the pre-defined angle, the controlling circuitry 210 may derive the decision parameter based on the second coordinate difference.

In embodiments disclosed herein, the decision parameter may decide whether to increment the second coordinate or the first coordinate of any one of the at least one first or second marker to construct the at least one row.

The controlling circuitry 210 may be further configured for deciding to rotate the image to decode the at least one optical code when the associated markers are not within the pre-defined angle.

Upon deriving the decision parameter, the controlling circuitry 210 may construct the at least one row comprising the at least one optical code, according to the derived decision parameter. The at least one row may be constructed in perpendicular to the selected at least two markers.

Constructing the row based on the decision parameter is described in detail in conjunction with FIGS. 6I and 7A-7F.

After constructing the at least one row, the controlling circuitry 210 decodes the at least one row to derive data corresponding to the at least one optical code. The derived data may be the data decoded from the encoded data of the at least one optical code.

For decoding the constructed at least one row, the controlling circuitry 210 may detect at least one marker related to the at least one optical code by decoding/scanning pixels of the constructed at least one row. The controlling circuitry 210 may then decode the at least one marker to derive the data corresponding to the at least one optical code.

For decoding the at least one marker, the controlling circuitry 210 may record pattern data related to the at least one optical code present at an end of the at least one marker. The controlling circuitry 210 may determine whether the recorded pattern data matches with a pre-defined pattern data related to one of a plurality of optical codes. When it has been determined that the recorded pattern data matches with the pre-defined pattern data, the controlling circuitry 210 may decode the pattern data to derive the data corresponding to the at least one optical code.

Thus, one or more optical codes of any orientation may be decoded without performing any binarization in the image, which further increases accuracy and speed of decoding.

The memory 212 may store at least one of: the image, the decoded data of the at least one optical code, the pre-defined pattern data of the plurality of optical codes, and so on.

Figure 3:
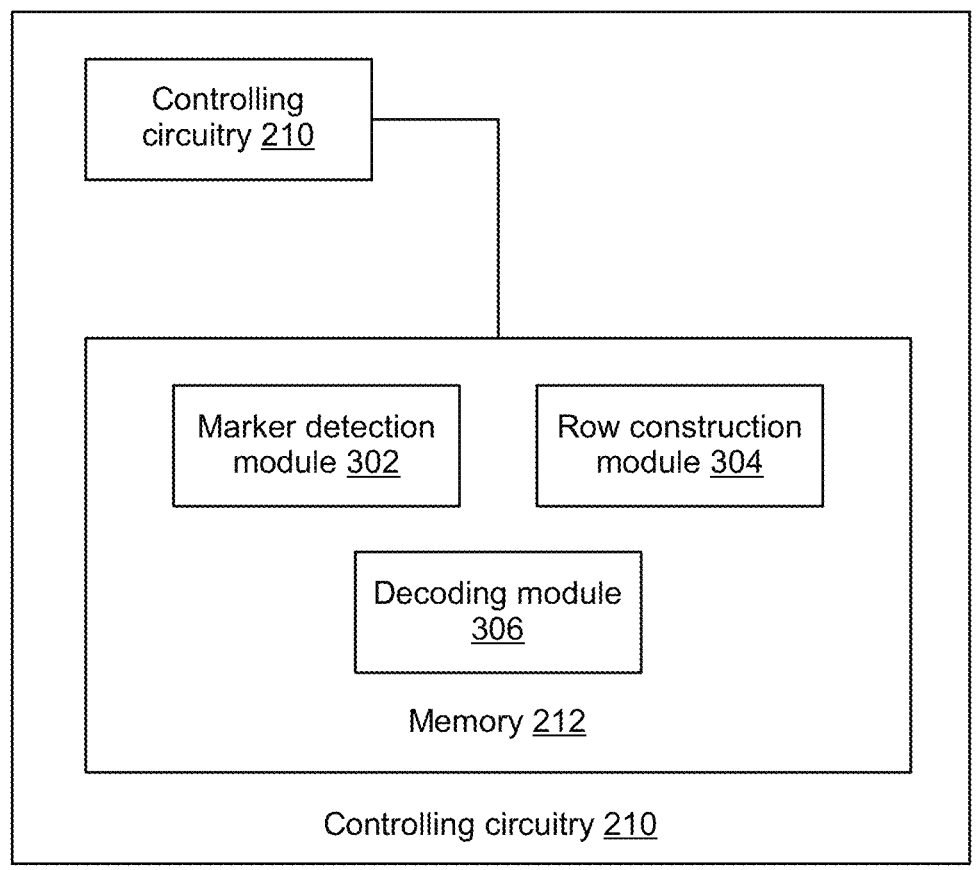
FIG. 3 discloses functional modules being executed by a controlling circuitry in a data reader to decode at least one optical code according to some embodiments.

FIG. 3 discloses functional modules being executed by the controlling circuitry 210 to decode the at least one optical code. As depicted in FIG. 3, the memory 212 comprises one or more computer-accessible instructions (that represent a software component), which may be assembled into one or more program modules such as, a marker detection module 302, a row construction module 304, and a decoding module 306. Such modules may be executed by the controlling circuitry 210 to decode the at least one optical code.

The marker detection module 302 may be configured to obtain the image comprising the at least one optical code positionable in one of a plurality of orientations in one of a plurality of rows representing a plurality of regions in the image. The marker detection module 302 may be configured to detect a plurality of markers related to the at least one optical code by decoding pixels of each row in the image at a time by following an interval of pre-defined rows. The markers identify positioning information and optical code format information of the at least one optical code in the image.

The row construction module 304 may be configured to construct at least one new row representing at least one sub region in the image comprising the at least one optical code when no optical code is decoded from the detected plurality of markers. The at least one new row may be constructed by grouping the plurality of markers. The plurality of markers are grouped based on a position of each marker and a pixel distance defined for grouping of markers.

The decoding module 306 may be configured to decode the constructed at least one row to derive data corresponding to the at least one optical code.

Figure 4:
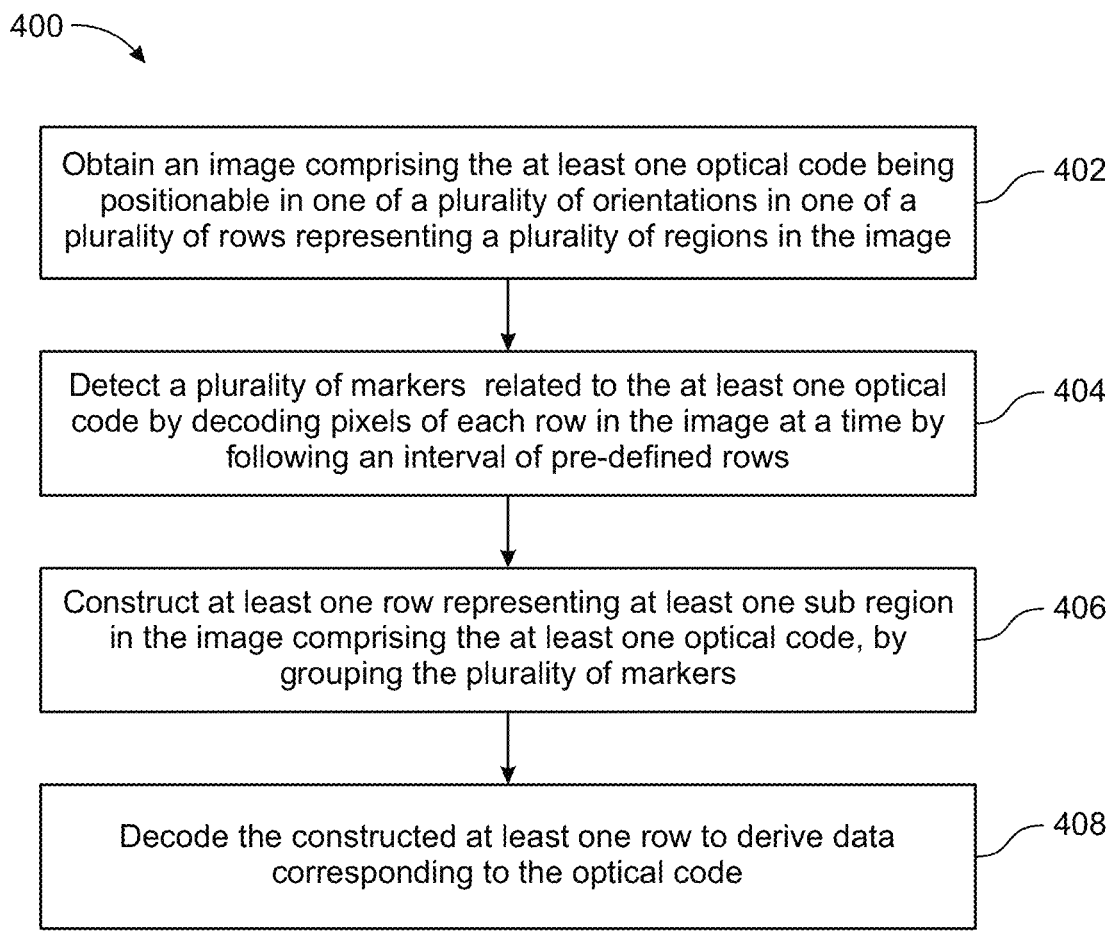
FIG. 4 is a flowchart illustrating example method steps of a method performed by a data reader for decoding at least one optical code according to some embodiments.

FIG. 4 is a flowchart illustrating example method steps of a method 400 performed by the data reader 100 for decoding the at least one optical code.

At step 402, the method 400 comprises obtaining an image comprising the at least one optical code being positionable in one of a plurality of orientations in one of a plurality of rows representing a plurality of regions in the image.

At step 404, the method 400 comprises detecting a plurality of markers related to the at least one optical code by decoding pixels of each row in the image at a time by following an interval of pre-defined rows. The markers identify positioning information and optical code format information of the at least one optical code in the image.

At step 406, the method 400 comprises constructing at least one row representing at least one sub region in the image comprising the at least one optical code when no optical code is decoded from the detected plurality of markers. The at least one row is constructed by grouping the plurality of markers based on a position of each marker and a pixel distance defined for grouping of markers.

In some embodiments, the step of constructing the at least one row may comprise selecting at least two markers of the plurality of markers that are in a same group. In accordance with analysis of the selected at least two markers, the method may comprise deriving a decision parameter indicating how to construct the at least one row. Based on the derived decision parameter, the method may comprise constructing the at least one row comprising the at least one optical code. In some embodiments, the constructed at least one row comprises a plurality of pixels and is in perpendicular to the selected at least two markers.

In some embodiments, the step of deriving the decision parameter may comprise identifying a first coordinate and a second coordinate of each of at least one first marker and at least one second marker of the selected at least two markers. The method may comprise determining a first coordinate difference by identifying a difference between the first coordinate of the at least one first marker and the first coordinate of the at least one second marker. The method may comprise determining a second coordinate difference by identifying a difference between the second coordinate of the at least one first marker and the second coordinate of the at least one second marker. Based on the first coordinate difference and the second coordinate difference, the method may comprise deriving the decision parameter.

In some embodiments, the step of deriving the decision parameter may further comprise determining whether the first coordinate difference greater than the second coordinate difference or the second coordinate difference greater than the first coordinate difference lies within a pre-defined angle. When it has been determined that the first coordinate difference greater than the second coordinate difference lies within the pre-defined angle, the method may comprise deriving the decision parameter based on the first coordinate difference. When it has been determined that the second coordinate difference greater than the first coordinate difference lies within the pre-defined angle, the method may comprise deriving the decision parameter based on the second coordinate difference.

In some embodiments, the method may comprise deciding to rotate the image to decode the at least one optical code when the associated markers are not within the pre-defined angle.

Upon constructing the at least one row, at step 408, the method 400 comprises decoding the constructed at least one row to derive data corresponding to the at least one optical code.

In some embodiments, the step of decoding the constructed at least one row may comprise detecting at least one marker related to the at least one optical code by decoding pixels of the constructed at least one row and decoding the detected at least one marker to derive the data corresponding to the at least one optical code.

In some embodiments, the step of decoding the detected at least one marker may comprise recording pattern data related to the at least one optical code present at an end of the at least one marker. The method may comprise determining whether the recorded pattern data matches with a pre-defined pattern data related to one of a plurality of optical codes. When it has been determined that the recorded pattern data matches with the pre-defined pattern data, the method may comprise decoding the pattern data to derive the data corresponding to the at least one optical code.

Figure 5:
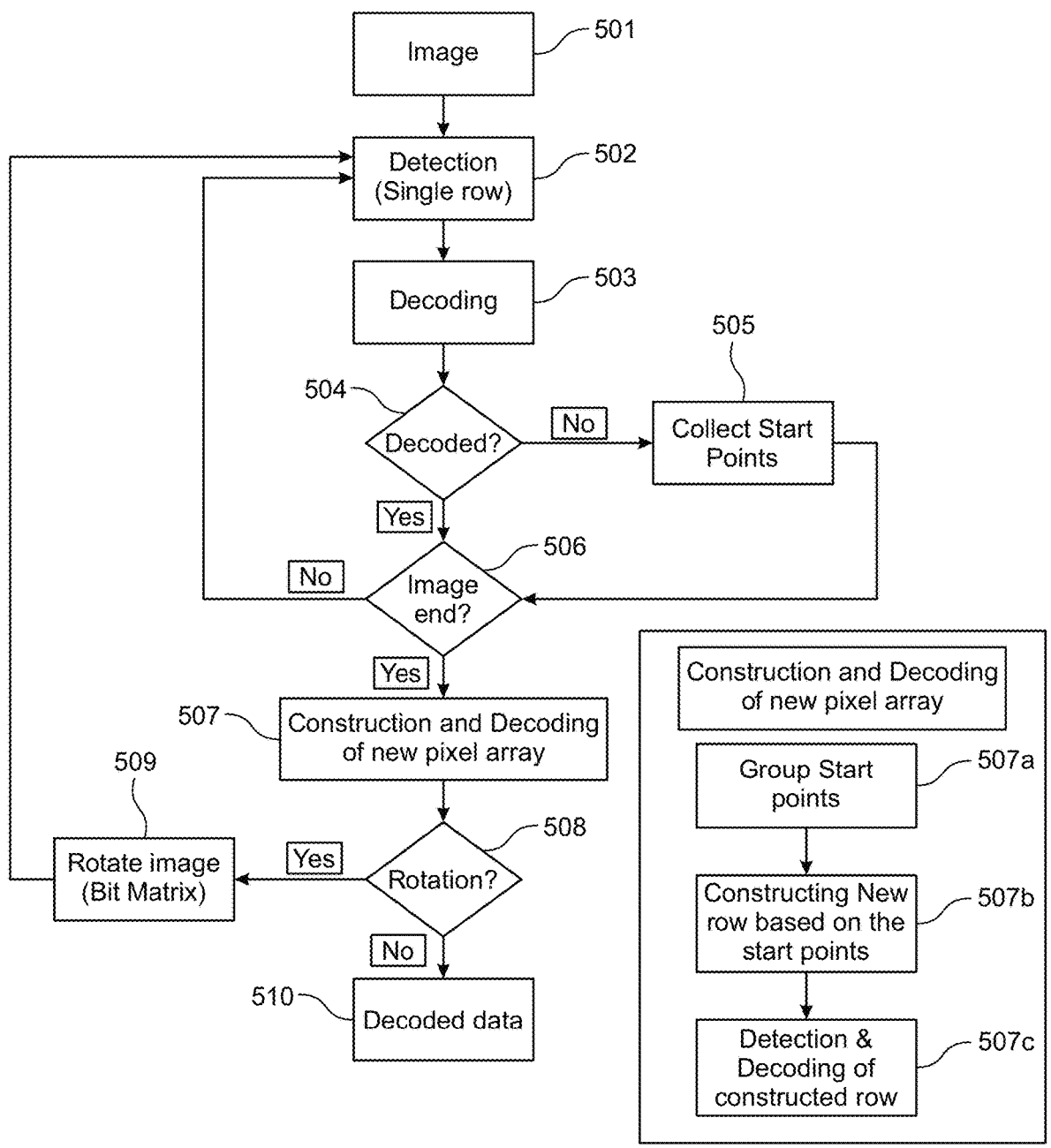
FIG. 5 is an example flowchart illustrating example steps of a method for decoding at least one optical code according to some embodiments.

FIG. 5 is an example flowchart illustrating example steps of the method for decoding at least one optical code.

At step 501, the data reader 100 obtains an image comprising the at least one optical code. The at least one optical code is positionable with different orientations in one of a plurality of rows, which represent a plurality of regions in the image. At step 502, the data reader 100 detects a first/single row of the image. At step 503, the data reader 100 decodes the at least one optical code by scanning the first row. At step 504, the data reader 100 checks whether the at least one optical code is decoded from the detected row. If the at least one optical code is not decoded (i.e., the optical code positioned with an orientation), at step 505, the data reader 100 collects one or more markers/start points from the first row by scanning/decoding all the pixels of the first row. Said markers identify positioning information/location and optical code format information of the at least one optical code.

If the at least one optical code is decoded (i.e., the optical code with no orientation), at step 506, the data reader 100 checks if the decoded row is present at an end of the image. If the decoded row is not at the end of the image, the data reader 100 recursively performs steps 502 to 506 until decoding the row present at the end of the image to collect a plurality of markers.

If the decoded row is at the end of the image, at step 507, the data reader 100 constructs and decodes a new row comprising an array of pixels. For constructing and decoding the new row, at step 507a, the data reader 100 groups the collected plurality of markers/start points. At step 507b, the data reader 100 constructs the new row according to the grouping of the markers. At step 507c, the data reader 100 detects at least one marker by scanning the pixels of the new row and decodes the detected at least one marker to derive data corresponding to the at least one optical code.

At step 508, the data reader 100 checks if the image is to be rotated for decoding of the at least one optical code with an angle exceeding a pre-defined angle. If the image is to be rotated, at step 509, the data reader 100 rotates the image and repeats steps 502-507 to decode the at least one optical code. If the image is not to be rotated, at step 510, the data reader 100 provides the decoded data of the optical code to at least one of: the user, the one or more computing devices in communication with the data reader 100, or the like.

FIGS. 6A-6I disclose example illustrations of comparing decoding of an optical code between the prior art and according to embodiments disclosed herein.

Figure 6A:
FIGS. 6A-6I disclose example illustrations of comparing decoding of an optical code between the prior art and according to embodiments disclosed herein.
Figure 6B:

FIGS. 6A, 6B, 6C, and 6D disclose example illustrations of decoding the optical code according to the prior art. FIG. 6A disclose an ideal optical code/barcode present in an obtained image with data "e-consys" is being encoded. According to the prior art, for decoding the encoded data in the optical code, the data reader scans lines of the optical code in a linear manner with an interval of "n" rows, as depicted in FIG. 6B. Since the data reader scans the lines of the optical code from left to right, the data reader may not be able to decode the optical code that is tilted or having any orientation.

Figure 6C:
Figure 6D:
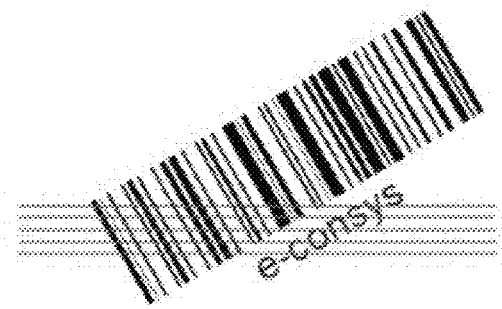

According to the prior art, an ideal maximum angle for the optical code to decode is when top left and bottom right of the optical code is in straight line. FIG. 6C discloses the maximum angle at which a start code/marker, data, a checksum and a stop code of the optical code are in a straight line. If the image is tilted in an anticlockwise direction beyond the maximum angle (depicted in FIG. 6C), then all the fields of the optical code may not meet in the single line of the optical code. Thus, the data reader may not able to decode the optical code exceeding the maximum angle, as depicted in FIG. 6D. From FIGS. 6A-6D, it is evident that the data reader may not able to decode the optical code, when it is tilted that is when the angle of the optical code exceeds the maximum angle.

In contrast to the prior art, the data reader 100 disclosed in embodiments herein decodes the optical code, when it is tilted or having any orientations. FIGS. 6E, 6F, 6G, 6H, and 6I disclose example illustrations of decoding the optical code according to embodiments herein.

Figure 6F:
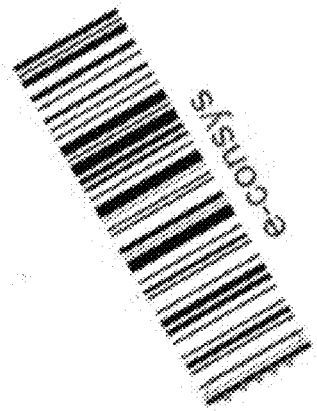
Figure 6I:
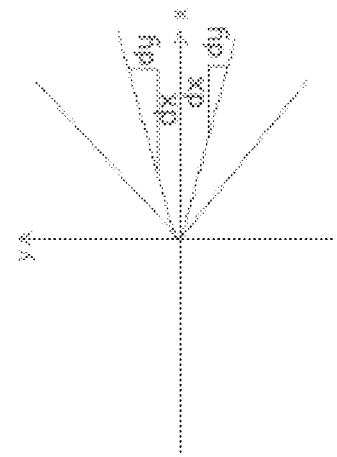
Figure 6H:
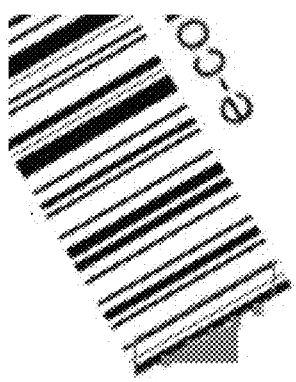
Figure 6E:
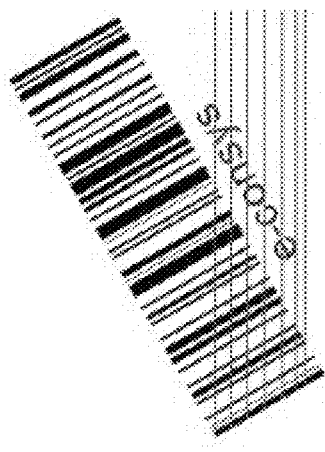

For decoding the tilted optical code, the data reader 100 starts collecting the markers/start codes of the optical code by scanning/decoding each row of the image comprising the optical code/barcode, as depicted in FIG. 6E. The markers/start codes collected by decoding the rows of the image are depicted in FIG. 6F.

Figure 6G:
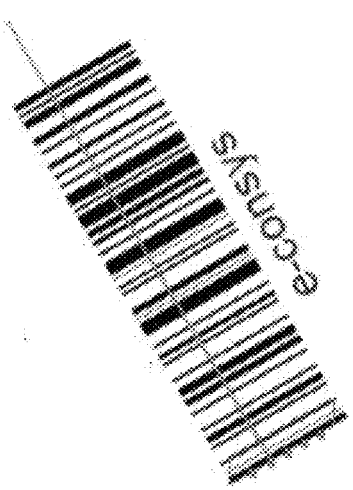

The data reader 100 constructs a new row by grouping the markers that lie within a 15 pixel distance, as depicted in FIG. 6G. The new row may be perpendicular to any of the two markers that are in same group, as depicted in FIG. 6G.

The data reader 100 constructs the new row in accordance with modified Bresenham's lime drawing method that work based on two points difference, for example, an X-difference and a Y-difference. For constructing the new row, the data reader 100 forms a triangle between any two of the markers, as depicted in FIG. 6H. From FIG. 6H, it is evident that Y-difference is greater than the X-difference. Hence, the data reader 100 samples X values and obtains the corresponding Y values. The Y-difference may always be greater than the X difference in-45 degree to +45 degree, as depicted in FIG. 6I. Further, the data reader 100 derives a decision parameter from a slope equation of modified Bresenham's lime drawing method to decide whether to increment the Y value or to retain the same Y value for constructing the new row.

FIGS. 7A-7F disclose an example illustration of constructing at least one row for at least one optical code. Embodiments herein enable the data reader 100 to construct the at least one row (i.e., a new row) for the at least one optical code by grouping a plurality of markers related to the at least one optical code. The constructed at least one row may be detected and decoded to derive the data of the at least one optical code. In some embodiments, the data reader 100 may use modified Bresenham's line drawing method for constructing the at least one row.

Figure 7A:
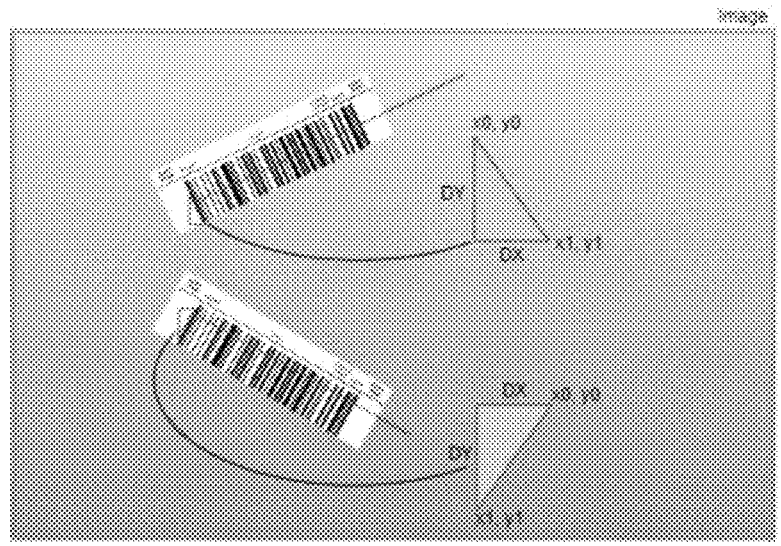
FIGS. 7A-7F disclose an example illustration of constructing at least one row for at least one optical code according to some embodiments.

For constructing the at least one row, the data reader 100 groups the two markers that are in a same group, and considers two coordinates (x0, x1) and (y0 and y1) from the two markers. The data reader 100 determines a first coordinate difference/X-difference as dx=abs (x1−x0) and a second coordinate difference/Y-difference as dy=abs (y1−y0), as depicted in FIG. 7A. Based on dx and dy, the data reader 100 derives the decision parameter, which may be used to construct the new row.

Figure 7B:
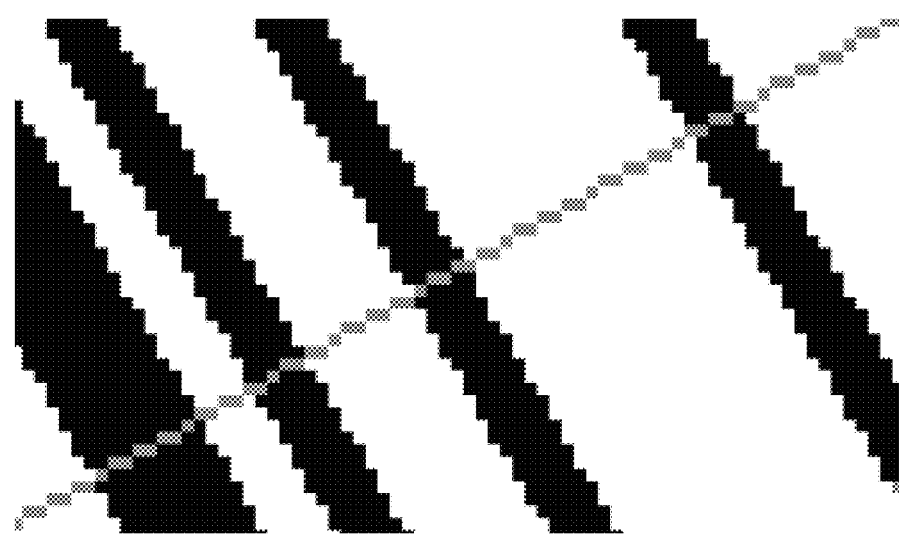

For example, consider that a 30 degree line/row has to be constructed for the two markers that are present in a same group. In such a scenario, the data reader 100 has to construct a step like structure, as depicted in FIG. 7B. For constructing the step like structure, the data reader 100 has to decide when to increment the dy value. The data reader 100 uses the decision parameter to decide when to increment the dy value for constructing the step like structure.

The decision parameter derived according to ideal Bresenham's line drawing method and according to embodiments herein (i.e., modified Bresenham's line drawing method) is depicted in below table:

TABLE 1

| Parameter | Ideal Bresenham method | Modified Bresenham method |
| --- | --- | --- |
| Initialization | D = (2 * dy) − dx | D = (2 * dx) − dy |
| Decision parameter (D > 0) | y = y + intercept<br>D = D − 2 * dy | y = y + intercept<br>D = D + 2 * (dy − dx) |
| Decision parameter (D < 0) | D = D + 2 * dx | D = D + 2 * dy |

Figure 7C:
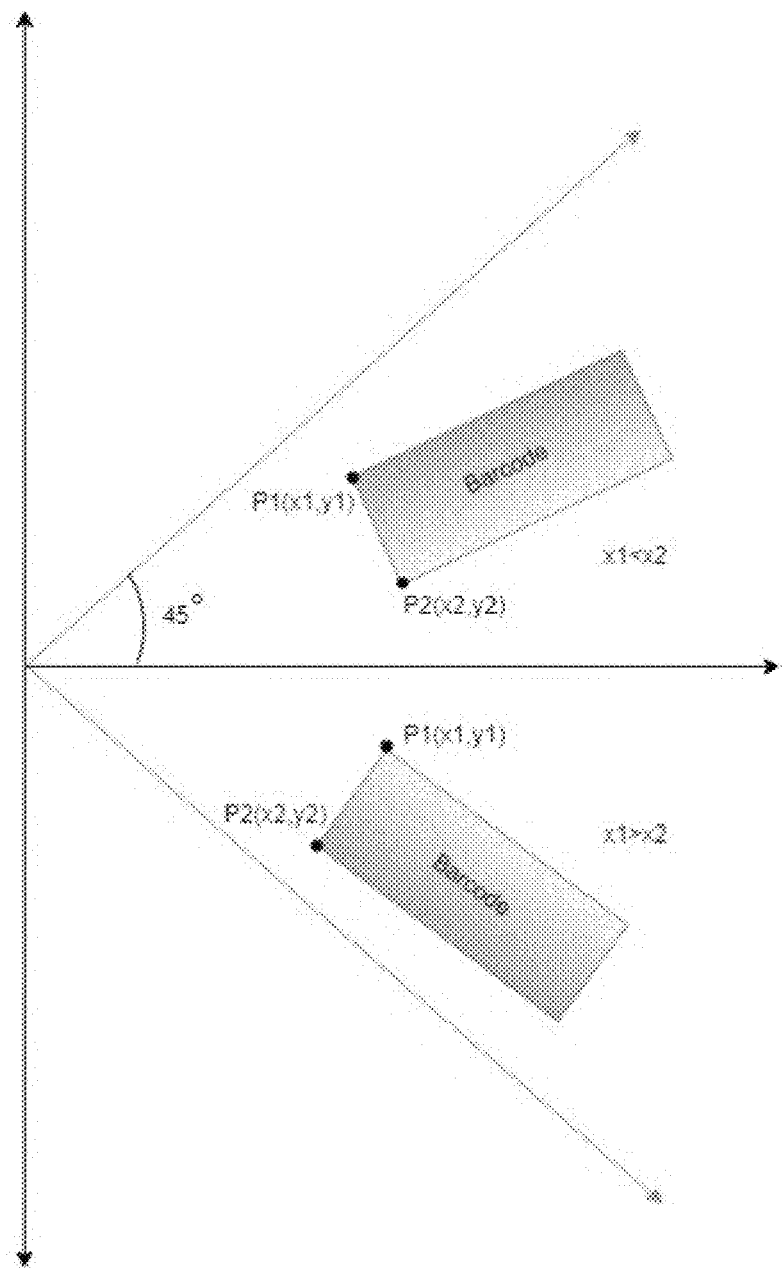

Intercept depicted in table 1 may be represented as intercept=((x1>x0)?−1:1) and decided based on whether y has to be incremented or decremented, as depicted in FIG. 7C. The new row constructed using the decision parameter may be perpendicular to the two markers that are in the same group. The new row may be constructed by appending pixels.

Figure 7D:
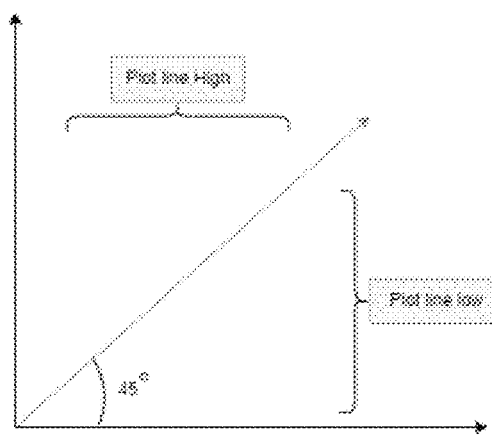

From the above table 1, it is understood that the data reader 100 may decode the optical code associated with angle from −45 degree to +45 degree, as depicted in FIG. 7D. Thus, the decoding may cover up to 90 degrees in the image. For the remaining angles of the optical code, the image has to be rotated to 90, 180, and 270 degree.

Further, the decision parameter may be derived based on detection of whether the X-difference greater than the Y-difference or the Y-difference greater than the X-difference lies in the pre-defined angle that is 45 degree. For example herein, consider that the Y-difference is greater than the X-difference, which is represented in a plot line low in FIG. 7D. Thus, the plot line may be decoded to derive the data from the optical code. When this condition fails, that is when the X-difference greater than the Y-difference (represented in a plot line high in FIG. 7D) does not lie in the 45 degree, which is represented in a plot high line, the image has to be rotated.

Figure 7E:
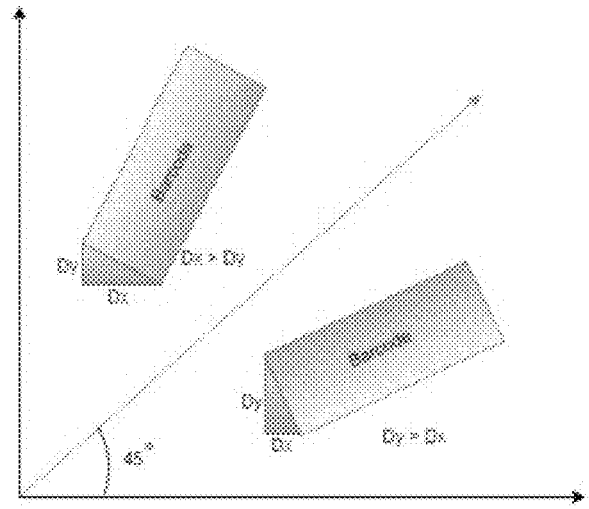
Figure 7F:
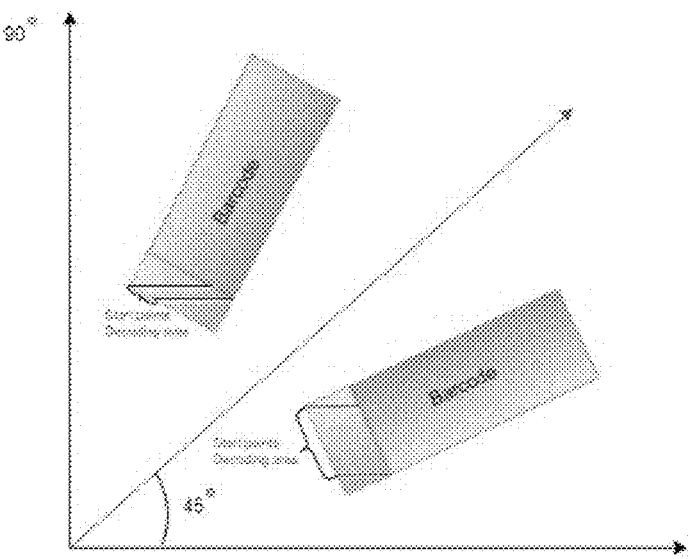

Also decoding of the optical code may depend on a nature of collection of the markers/start points, Whenever the angle of the optical code exceeds 45 degree then a possibility to obtain the markers/start points may be less. Hence, if the optical code in the plot line high is decoded, processing time may be increased. Thus, the optical code in the plot line low may be decoded, as depicted in FIGS. 7E and 7F. The optical code associated with the angle other than 45 degree may be decoded by rotating the image.

Exemplary tables (2 and 3) are provided below, which depict example illustrations of decoding different optical codes according to the prior art and according to embodiments disclosed herein.

TABLE 2

| Image sample | Decoding according to the prior art | Decoding according to embodiments disclosed herein | Inference |
|---|---|---|---|
|  | Decoding failed | Decoding successful | Since the prior art does not support decoding of sloped |

TABLE 2-continued

| Image sample | Decoding according to the prior art | Decoding according to embodiments disclosed herein | Inference |
|---|---|---|---|
|  | Decoding failed | Decoding successful | barcodes/optical codes, decoding of the barcodes may be failed |
|  | Decoding failed | Decoding successful | |
|  | Decoding failed | Decoding successful | |
|  | Decoding failed | Decoding successful | |

TABLE 3

| Image sample with multiple optical codes/barcodes | Decoding according to the prior art | Decoding according to embodiments disclosed herein |
|---|---|---|
|  | Decodes "e-consys" barcode and barcode 90311017 is not decoded | Decodes both the barcodes |
|  | Decodes "e-consys" barcode and barcode 90311017 is not decoded | Decodes both the barcodes |
|  | Decodes "e-consys" barcode and barcode 90311017 is not decoded | Decodes both the barcodes |
|  | Decodes "e-consys" barcode and barcode 90311017 is not decoded | Decodes both the barcodes |
|  | Decodes "e-consys" barcode and barcode 90311017 is not decoded | Decodes both the barcodes |

Thus, embodiments provided herein may decode multiple optical codes/barcodes having different orientations with high accuracy and speed.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors, DSPs, special-purpose digital logic, and the like. The processing circuitry may be configured to execute program code stored in memory, which may include one or several types of memory such as read-only memory (ROM), random-access memory, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the disclosure.

Figure 8:
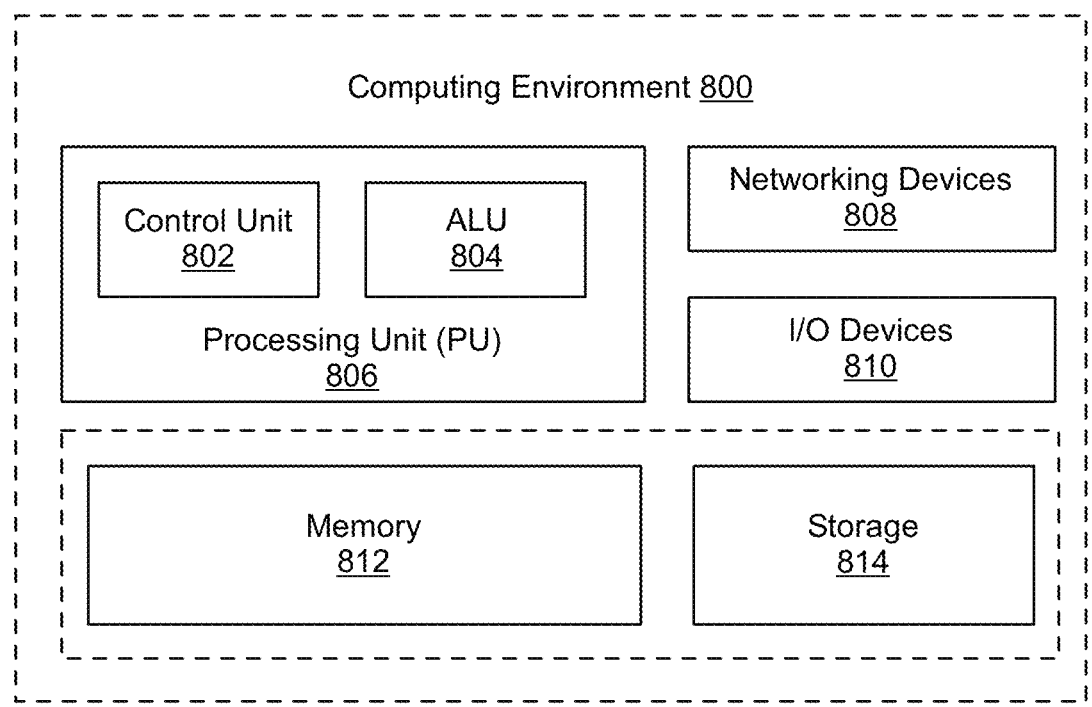
FIG. 8 discloses an example computing environment, according to some embodiments.

FIG. 8 illustrates an example computing environment 800 implementing a method and the data reader 100 as described in FIG. 4. As depicted in FIG. 8, the computing environment 800 comprises at least one data processing module 806 that is equipped with a control module 802 and an Arithmetic Logic Unit (ALU) 804, a plurality of networking devices 808 and a plurality Input output, I/O devices 810, a memory 812, a storage 814. The data processing module 806 may be responsible for implementing the method described in FIG. 4. For example, the data processing module 806 may in some embodiments be equivalent to the controlling circuitry 210 described above in conjunction with FIGS. 2 and 3. The data processing module 806 is capable of executing software instructions stored in memory 812. The data processing module 806 receives commands from the control module 802 in order to perform its processing. Further, any logical and arithmetic operations involved in the execution of the instructions are computed with the help of the ALU 804.

The computer program is loadable into the data processing module 806, which may, for example, be comprised in an electronic apparatus (such as a data reader 100). When loaded into the data processing module 806, the computer program may be stored in the memory 812 associated with or comprised in the data processing module 806. According to some embodiments, the computer program may, when loaded into and run by the data processing module 806, cause execution of method steps according to, for example, the method illustrated in FIG. 4 or otherwise described herein.

The overall computing environment 800 may be composed of multiple homogeneous and/or heterogeneous cores, multiple CPUs of different kinds, special media and other accelerators. Further, the plurality of data processing modules 806 may be located on a single chip or over multiple chips.

The algorithm comprising of instructions and codes required for the implementation are stored in either the memory 812 or the storage 814 or both. At the time of execution, the instructions may be fetched from the corresponding memory 812 and/or storage 814, and executed by the data processing module 806.

In case of any hardware implementations various networking devices 808 or external I/O devices 810 may be connected to the computing environment to support the implementation through the networking devices 808 and the I/O devices 810.

The embodiments disclosed herein can be implemented through at least one software program running on at least one hardware device and performing network management functions to control the elements. The elements shown in FIG. 8 include blocks which can be at least one of a hardware device, or a combination of hardware device and software module.

What is claimed is:

1. A method performed by a data reader for decoding at least one optical code, the method comprising:
    obtaining an image comprising the at least one optical code being positionable in one of a plurality of orientations in one of a plurality of rows representing a plurality of regions in the image;
    detecting a plurality of markers related to the at least one optical code by decoding pixels of each row in the image at a time by following an interval of pre-defined rows, wherein said plurality of markers identify positioning information and optical code format information of the at least one optical code in the image;
    constructing at least one row representing at least one sub region in the image comprising the at least one optical code when no optical code is decoded from the detected plurality of markers, wherein the at least one row is constructed by grouping the plurality of markers based on a position of each marker and a pixel distance defined for grouping of markers; and
    decoding the constructed at least one row to derive data corresponding to the at least one optical code.

2. The method according to claim 1, wherein constructing the at least one row comprises:
    selecting at least two markers of the plurality of markers that are in a same group;
    deriving, in accordance with analysis of the selected at least two markers, a decision parameter indicating how to construct the at least one row; and
    constructing, based on the derived decision parameter, the at least one row comprising the at least one optical code.

3. The method according to claim 2, wherein the constructed at least one row comprises a plurality of pixels and is in perpendicular to the selected at least two markers.

4. The method according to claim 2, wherein deriving the decision parameter comprises:
    identifying a first coordinate and a second coordinate of each of at least one first marker and at least one second marker of the selected at least two markers;

determining a first coordinate difference by identifying a difference between the first coordinate of the at least one first marker and the first coordinate of the at least one second marker;

determining a second coordinate difference by identifying a difference between the second coordinate of the at least one first marker and the second coordinate of the at least one second marker; and deriving the decision parameter based on the first coordinate difference and the second coordinate difference.

5. The method according to claim 4, wherein deriving the decision parameter further comprises:

determining whether the first coordinate difference greater than the second coordinate difference or the second coordinate difference greater than the first coordinate difference lies within a pre-defined angle; and when it has been determined that the first coordinate difference greater than the second coordinate difference lies within the pre-defined angle, deriving the decision parameter based on the first coordinate difference; or when it has been determined that the second coordinate difference greater than the first coordinate difference lies within the pre-defined angle, deriving the decision parameter based on the second coordinate difference.

6. The method according to claim 5, further comprising:

deciding to rotate the image to decode the at least one optical code when the associated markers are not within the pre-defined angle.

7. The method according to claim 1, wherein decoding the constructed at least one row comprises:

detecting at least one marker related to the at least one optical code by decoding pixels of the constructed at least one row; and decoding the detected at least one marker to derive the data corresponding to the at least one optical code.

8. The method according to claim 7, wherein decoding the detected at least one marker comprises:

recording pattern data related to the at least one optical code present at an end of the at least one marker;

determining whether the recorded pattern data matches with a pre-defined pattern data related to one of a plurality of optical codes; and when it has been determined that the recorded pattern data matches with the pre- defined pattern data, decoding the pattern data to derive the data corresponding to the at least one optical code.

9. A computer program product comprising a non-transitory computer readable medium, having thereon a computer program comprising program instructions, wherein the computer program is loadable into a data processing unit and configured to cause execution of the method according to claim 1 when the computer program is run by the data processing unit.

10. A data reader for decoding at least one optical code, the data reader comprising:

a scanner module configured for:

obtaining an image comprising the at least one optical code being positionable in one of a plurality of orientations in one of a plurality of rows representing a plurality of regions in the image; and a controlling circuitry coupled to the scanner module configured for:

detecting a plurality of markers related to the at least one optical code by decoding pixels of each row in the image at a time by following an interval of pre-defined rows, wherein said plurality of markers identify positioning information and optical code format information of the at least one optical code in the image;

constructing at least one row representing at least one sub region in the image comprising the at least one optical code when no optical code is decoded from the detected plurality of markers, wherein the at least one row is constructed by grouping the plurality of markers based on a position of each marker and a pixel distance defined for grouping of markers; and decoding the constructed at least one row to derive data corresponding to the at least one optical code.

11. The data reader according to claim 10, wherein the controlling circuitry is configured for constructing the at least one row by:

selecting at least two markers of the plurality of markers that are in a same group;

deriving, in accordance with analysis of the selected at least two markers, a decision parameter indicating how to construct the at least one row; and constructing, based on the derived decision parameter, the at least one row comprising the at least one optical code.

12. The data reader according to claim 11, wherein the constructed at least one row comprises a plurality of pixels and is in perpendicular to the selected at least two markers.

13. The data reader according to claim 11, wherein the controlling circuitry is configured for constructing the at least one row by:

identifying a first coordinate and a second coordinate of each of at least one first marker and at least one second marker of the selected at least two markers;

determining a first coordinate difference by identifying a difference between the first coordinate of the at least one first marker and the first coordinate of the at least one second marker;

determining a second coordinate difference by identifying a difference between the second coordinate of the at least one first marker and the second coordinate of the at least one second marker; and deriving the decision parameter based on the first coordinate difference and the second coordinate difference.

14. The data reader according to claim 13, wherein the controlling circuitry is further configured for deriving the decision parameter by:

determining whether the first coordinate difference greater than the second coordinate difference or the second coordinate difference greater than the first coordinate difference lies within a pre-defined angle; and when it has been determined that the first coordinate difference greater than the second coordinate difference lies within the pre-defined angle, deriving the decision parameter based on the first coordinate difference; or when it has been determined that the second coordinate difference greater than the first coordinate difference lies within the pre-defined angle, deriving the decision parameter based on the second coordinate difference.

15. The data reader according to claim 14, wherein the controlling circuitry is further configured for deciding to rotate the image to decode the at least one optical code when the associated markers are not within the pre-defined angle.

16. The data reader according to claim 10, wherein the controlling circuitry is configured for decoding the constructed at least one row by:

detecting at least one marker related to the at least one optical code by decoding pixels of the constructed at least one row; and decoding the detected at least one marker to derive the data corresponding to the at least one optical code.

17. The data reader according to claim 16, wherein the controlling circuitry is configured for decoding the constructed at least one row by:

recording pattern data related to the at least one optical code present at an end of the at least one marker;

determining whether the recorded pattern data matches with a pre-defined pattern data related to one of a plurality of optical codes; and when it has been determined that the recorded pattern data matches with the pre-defined pattern data, decoding the pattern data to derive the data corresponding to the at least one optical code.

* * * * *